Sept. 24, 1957 R. J. SONNENFELD ET AL 2,807,597
STABLE LATICES OF ACIDIC AND BASIC COPOLYMERS AND
PROCESS FOR PREPARING THEM
Filed July 26, 1954
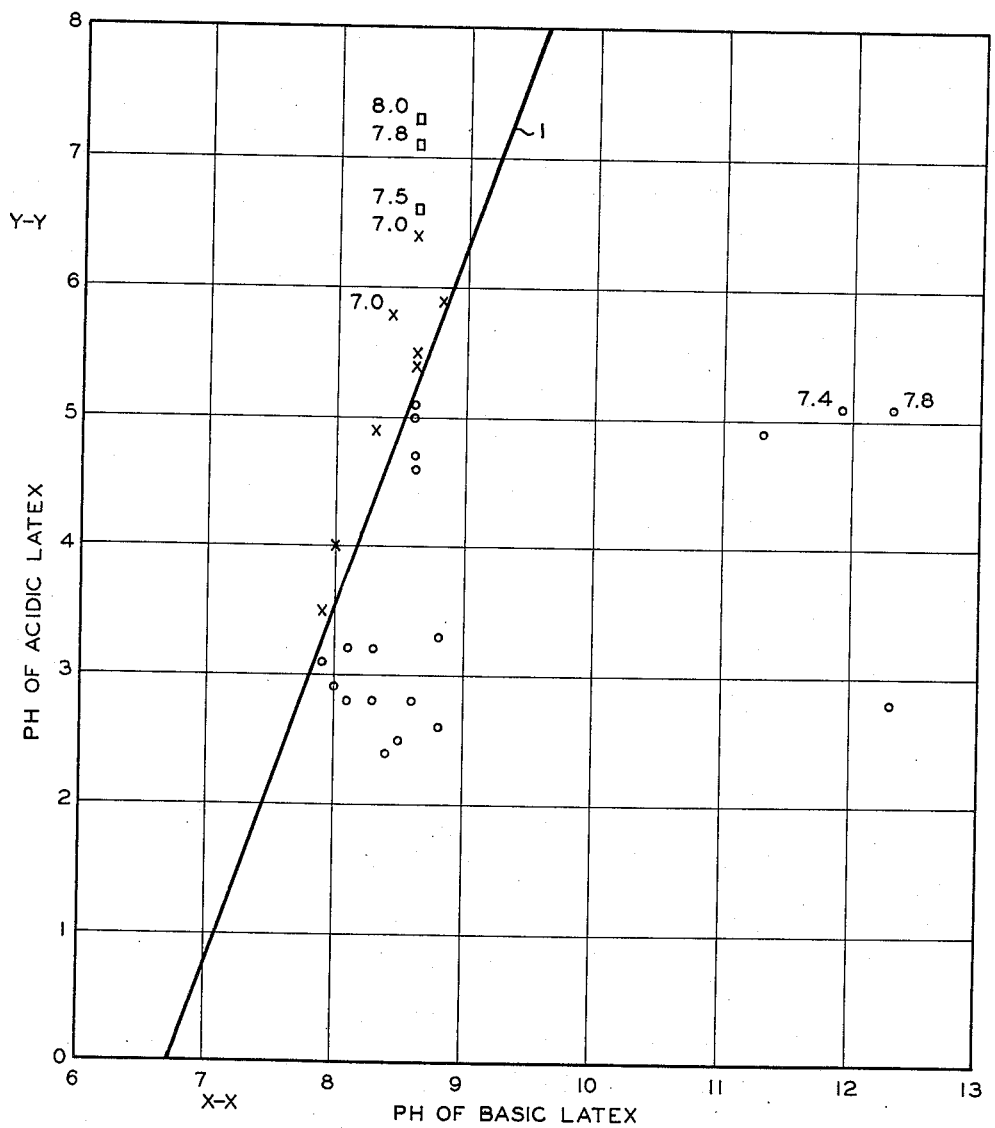
-LEGEND-
x-LESS THAN 10% COAGULATION
o-MORE THAN 10% COAGULATION
□-VISCOUS FINE SUSPENSION
NUMBER REFERS TO PH OF MIXTURE
INVENTORS
R. J. SONNENFELD
L. A. MITCHELL
BY
ATTORNEYS United States Patent Office 2,807,597
Patented Sept. 24, 1957

2,807,597

STABLE LATICES OF ACIDIC AND BASIC COPOLYMERS AND PROCESS FOR PREPARING THEM

Richard J. Sonnenfeld, Norman, Okla., and Lesher A. Mitchell, Borger, Tex., assignors to Phillips Petroleum Company, a corporation of Delaware Application July 26, 1954, Serial No. 445,782

20 Claims. (Cl. 260—29.7)

This invention relates to stable latices in which two types of polymeric materials are present as the dispersed phase, one type having a multiplicity of acidic groups and the other having a multiplicity of basic nitrogen groups. More specifically, this invention relates to stable latices prepared by bringing together under controlled conditions, a latex of a copolymeric material having a multiplicity of carboxy groups with a latex of a copolymeric material having a multiplicity of basic nitrogen groups. In one of its preferred embodiments, this invention relates to a stable latex prepared by bringing together under controlled conditions, a latex of butadiene-acrylic acid copolymer and a latex of butadiene-methylvinylpyridine copolymer.

The art of polymerization is old. There are many known polymers and copolymers whose properties range from liquid to rubbery to resinous. When monomeric materials are polymerized in an aqueous medium, the resulting suspension or emulsion of polymer is known as a latex. The polymeric material can be separated from the aqueous emulsion, such as by coagulation, and the polymeric material recovered for subsequent use, or the latex may be used as such. For example, the latex is useful in latex base paints, cord-dip formulations, cloth treatment, adhesives, sealants, protective coatings, production of various type films, dipped goods, and foam sponge.

The coagulated polymeric material can be dissolved in organic solvents and can be used in much the same way as enumerated for the latex.

We have discovered that when a latex of a polymer containing a multiplicity of acidic groups is blended with a latex of a polymer containing a multiplicity of basic nitrogen groups, and this latex is used for any of the purposes for which latex is ordinarily used, a higher quality product results and this can be accomplished without the use of vulcanizing agents. While our preferred embodiment does not require vulcanizing or a compounding agent, the use of such agents is within the scope of this invention. One method for incorporating the compounding agent, such as vulcanizing agent, into the latex is to have said agent in solution, however, any method of incorporating such agents known in the art is within the scope of our invention.

An object of this invention, therefore, is to bring together a latex of a polymer containing a multiplicity of acidic groups and a latex of a polymer containing a multiplicity of basic groups under controlled conditions so that a stable latex is formed.

Another object of this invention is to provide a stable latex containing both a polymer having a multiplicity of basic nitrogen groups and a polymer having a multiplicity of acidic groups.

Further objects and advantages of this invention will be apparent to those skilled in the art upon reading this specification and the attached claims.

In discussing this invention, we will refer to the latex of a polymer having a multiplicity of acidic groups as an acid latex and the polymer as an acid polymer. We will refer to the latex of a polymer having a multiplicity of basic nitrogen groups as a basic latex and the polymer as a basic polymer.

In the preparation of the stable latices of this invention, it is preferred that both the acidic and basic latices be stripped exhaustively to remove unreacted monomers prior to the blending operation. It is also important that the pH of the individual latices be regulated so that coagulation does not occur when they are blended. It is further important that the emulsifying agents used in the preparation of the acidic and basic latices be of such nature that they are compatible in order that precipitation will not occur when the latices are blended. That is, emulsifiers which are coreactive would not be used. For example, if the acidic latex is prepared using an alkyl aryl sulfonate or an alkyl sulfate or sulfonate, these same emulsifiers can be employed for the preparation of the basic latex or such emulsifiers as fatty acid soaps or rosin soaps could be used. On the other hand, if the acidic acid latex is prepared using an amine type or quaternary ammonium salt emulsifier, a sulfonate type could be used for preparation of the basic latex, but, in this case, a fatty acid or rosin acid soap would not be applicable since the acid radical of the soap would react with the basic radical of the other emulsifier.

Prior to blending the acidic and basic latices to give the stable latex compositions of this invention, the pH of the two individual latices must be adjusted to within the operable range as hereinafter explained. The pH can generally be adjusted by exhaustively stripping the unreacted monomer from the latex containing the polymer or an inorganic base, such as ammonium or sodium hydroxide, can be used to adjust the pH of the acidic latex. It is generally preferred that the pH of the basic latex be adjusted only by stripping and correcting the acid latex by other means if necessary, however, an inorganic acid can be used to adjust the pH of the basic latex. It is also within the scope of this invention to use organic acids and bases to adjust the pH of the latices.

The pH of the basic and acid latex are related and the adjustment of the pH is peculiar to each latex system employed. This relationship can best be described by referring to the attached drawing which is made a part of this specification.

The drawing is a graph where the pH of the basic latex is plotted against the pH of the acid latex.

Referring to the drawing, along the horizontal axis X—X are shown the pH of the basic latex and along the vertical axis Y—Y are shown the pH of the acidic latex.

The crosses (×) show the pH of the basic and acidic latices which can be mixed without excessive coagulation, the circles (○) show the pH of the acidic and basic latices which could not be successfully blended and the squares (□) indicate latices which markedly increased in viscosity upon mixing. The line 1 represents the dividing line between the operable latices and the non-operable latices. In preparing this drawing, we considered those mixed latices having less than 10 percent of the blend coagulated as being operable. This line is represented by the equation $Y = 2.8X - 18.75$ where $Y$ is the pH of the acidic latex and $X$ is the pH of the basic latex. Latices having a pH which would fall on the left hand side of this line 1 are considered operable while those on the other side are not operable. In general, the pH of the basic latex should not be less than 7 nor greater than 12 and the pH of the acidic latex should not be less than 2 nor greater than 7.0. Preferably the pH of the basic latex will be within the range of 7 and 9 and the pH of the acidic latex will be in the range of 3 and 7.

Whenever the pH of the mixed latex was above 7, it has been indicated on the drawing. From this, it can be seen that even though the two latices should be capable of forming a stable mixed latex, that there is an additional requirement in that the pH of the blend must be 7 or less. The pH of the blend will be dependent upon the pH of the two individual latices, the blending ratios, and the percent functional group in each copolymer.

For optimum results, the pH is peculiar to each latex system employed. It is, of course, understood that the pH of each latex must be kept within the range where the individual latices are stable, that is, no precipitate should form. The production of stable latex is known in the art and needs no elaboration here. The requirement is that pH be so regulated that coagulation does not occur during blending of the individual latices and that the product be stable when stored, transported, or employed in any of the various applications in which it is suitable. When latices containing a high ratio of functional basic and acid groups are blended, as when the percent solids in the latices is high, there will be some coagulation or precipitation. This material can be filtered out and the filtered latex will then be stable. In general, the coagulation will not be greater than 10 percent of the total polymeric material present, but in no case should it consume all of either functional group.

As was hereinbefore stated, the stable latex blends of this invention have numerous uses. They are suitable for use in latex base paints, cord-dip formulations, cloth treatment, adhesives, sealants, protective coatings, production of various types of films, dipped goods, foam sponge, etc.

The type of polymer blend chosen will depend upon the ultimate use of the product. For some applications, such as the manufacture of adhesives and sealants, a stoichiometric excess of acid groups is frequently considered desirable. In other instances, an excess of basic nitrogen groups might be preferred. For the optimum development of film strength, it is preferable to adjust the quantities of the individual latices so that stoichiometrically equivalent amounts of acid and basic nitrogen groups are present.

The stable latices herein described have certain advantages over organic solutions of similar types of polymeric materials. When solutions are prepared, the concentration of polymer in the solvent is generally kept relatively low in order that the viscosity of the solution will not be too high. On the other hand, latices can be prepared which have a relatively low viscosity but fairly high polymer concentration. We prefer to blend latices having from 1 to 40 percent solids. These latices have high mechanical stability without special treatment and are, therefore, easily handled. This fact makes the products particularly suitable for foam sponge applications. Various ingredients that can be masterbatched into a rubber latex can be used in latex compositions of this invention such as sulfur, carbon black, accelerators, fillers, etc. These latices can be used in their various applications both with and without vulcanizing agents. When films are produced from the latices herein described, they can be boiled in water and soluble components extracted without destroying the film.

The two types of latices can be blended in widely varying proportions. It is not necessary that they be employed in such quantities that stoichiometrically equivalent amounts of acid and basic nitrogen groups be present or that the same monomer ratios be used in the production of the separate latices. For example, if latices of 50/50 copolymers are employed, they can be blended in such a way that the amount of either polymer can be in the range between 1 and 99 parts by weight per 100 parts of total dispersed polymeric material, preferably between 25 and 75 parts. Variations can also be introduced by using, e. g., a latex of a 50/50 copolymer in one instance and a latex of 90/10 copolymer in the other. When the aqueous phase is removed from the latex composition, a reaction occurs between the two types of polymeric materials.

It is generally recognized that temperature will effect coagulation and reaction. For that reason, we prefer to keep our stable latex under 110° F. but above the freezing point of the latex.

The latices which are applicable in our blended latices are prepared by aqueous emulsion polymerization. In effecting one form of such aqueous emulsion polymerization, particularly when a batch-type or semi-batch-type operation is carried out, the reactor is usually first charged with an aqueous medium which contains the desired emulsifying agent, and the monomeric material. An activator solution and an oxidant are separately added to the reaction mixture and reaction then proceeds. A preferred manner of adding these two latter constitutents has been usually to have the activator solution incorporated in an aqueous medium prior to addition of the monomeric material, and then to add the oxidant as the last ingredient. It is also sometimes the practice to add portions of one or the other of the activator solutions and oxidant intermittently, or continuously during the course of the reaction. If the operation is carried out continuously, streams of the various ingredients are admixed in somewhat the same order prior to their final introduction into the polymerization zone.

The following recipes are given as examples of some of the types of polymerization recipes that can be used in accordance with our invention, and are presented as being typical of those to which our invention is applied.

RECIPE

| Diazothioether | Iron pyrophosphate (Redox) | Polyalkylene polyamine |
| --- | --- | --- |
| Monomer<br>Water<br>Modifier<br>Emulsifier<br>Diazothioether<br>Electrolyte (optional)<br>Alkali metal hydroxide (optional) | Monomer<br>Water<br>Modifier<br>Hydroperoxide<br>Emulsifier<br>Sugar (optional)<br>Alkali-metal pyrophosphate<br>FeSO$_4$.7H$_2$O<br>Electrolyte (optional)<br>Alkali metal hydroxide (optional) | Monomer<br>Water<br>Electrolyte (optional)<br>Alkali metal hydroxide (optional)<br>Emulsifier<br>Modifier<br>Hydroperoxide<br>Polyalkylene polyamine |

The emulsifying agents employed in emulsion polymerization systems include alkali metal alkyl aryl sulfonates such as sodium and potassium alkylbenzene and alkyltoluene sulfonates; sulfates of long-chain aliphatic alcohols such as sodium lauryl sulfates; water soluble acid salts of organic bases containing a hydrocarbon chain of 8 to 24 carbon atoms, e. g. hydrochloric, sulfonic, formic, and acetic acid salts of primary, secondary, and tertiary amines such as octylamines, dodecylamines, octadecylamines, and octadecenylamines; quaternary ammonium salts such as cetyl trimethyl ammonium bromides, and the like; the alkali metal and ammonium salts of fatty acids, such as sodium oleate, sodium stearate, sodium laurate, sodium myristate, sodium palmitate, the corresponding potassium salts and the like ammonium salts; the ammonium and alkali metal salts of rosin acids such as the ammonium, sodium and potassium salts of abietic acid, dihydroabietic acid, and tetrahydroabietic acid; and non ionic emulsifying agents such as the condensation products of mercaptan with ethylene oxide and the like. As has been previously pointed out, the two latices need not comprise the same emulsifying agent. It is within the skill of the art to choose the emulsifying agent for the particular recipe. For example, it is known that fatty acid and rosin soaps would not be used in an acid system. Also, if the pH of the final blend is to be strongly acid, a soap would not be used for the preparation of the basic latex. The amount of emulsifier used will depend upon the particular monomer, the amount of aqueous phase, etc. In general, when 150 to 350 parts of water per 100 parts of monomer is employed, then 1 to 10 parts emulsifier will be used.

While any modifying agent known to the art can be used without departing from the scope of this invention, the modifying agents most generally used are sulfur containing compounds such as mercaptans, organic sulfides, thio and di-thionic acids and salts, xanthogenic acids and salts, thiocarbamic acids and salts and the like. However, the aryl and alkyl mercaptans are most generally used as modifiers in emulsion polymerization systems and we have found that tertiary $C_{12}$ to $C_{16}$ mercaptans are of particular value. The mercaptans used will generally contain 3–16 carbon atoms per molecule. Mixtures or blends of mercaptans are often used, the amount of mercaptan employed will be dependent upon the particular mercaptan or blend, the operating temperature, the monomeric materials employed, etc., as well as economic considerations. In general, the greater modification is obtained when operating at low temperatures and therefore a smaller amount of mercaptan is required at the lower temperatures. In general, where a rubbery material is desired, .01 to 3 parts of modifier per 100 parts of monomer will be used. However, larger amounts of modifier can be used, say up to 20 when a liquid polymer is desired.

Suitable hydroperoxides for use in iron pyrophosphate (Redox) and polyalkylene polyamine recipes and other recipes calling for an oxygen-yielding material are preferably organic hydroperoxides having the formula

RR'R"COOH wherein each of R, R', and R" is an organic radical, or R'R" together comprise a tetramethylene or pentamethylene group forming with the R—COOH a cyclopentyl or cyclohexyl hydroperoxide. Each of R, R' and R" can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether groups, sulfur in similar groups (i. e., mercapto compounds and thioethers), and halogen compounds. Examples of such hydroperoxides include diisopropyl hydroperoxide (isopropyl(dimethyl)hydroperoxymethane), cumene hydroperoxide (phenyl(dimethyl)hydroperoxymethane), 1 - methyl - 1 - hydroperoxycyclopentane, tetralin hydroperoxide, phenylcyclohexane hydroperoxide, octahydrophenanthrene hydroperoxide, diisopropylbenzene hydroperoxide (dimethyl(isopropylphenyl)hydroperoxymethane), methylethyl(ethoxyphenyl)hydroperoxymethane, methyldecyl(methylphenyl)hydroperoxymethane, dimethyldecylhydroperoxymethane, methyl(chlorophenyl)phenylhydroperoxymethane, and tertiary-butylisopropylbenzene hydroperoxide [dimethyl(tertiary-butylphenyl)hydroperoxymethane].

The amount of hydroperoxide used to obtain an optimum reaction rate will depend upon the other reaction conditions, and particularly upon the type of polymerization recipe used. The amount is generally expressed in millimols per 100 parts of monomeric material, using in each instance the same units of weight throughout, i. e., when the monomeric material is measured in pounds the hydroperoxide is measured in millipound mols. The same is true for other ingredients of the polymerization recipe. An optimum rate of polymerization is usually obtained with the amount of hydroperoxide between 0.1 and 10 millimols per 100 parts by weight of monomeric material.

In the case of a diazothioether recipe, preferably diazothioethers having the formula R—N=N—S—R' where R and R' are aromatic groups containing substituents such as alkyl, chloro, nitro, methoxy, sulfonic acid group, and R' can also be cycloalkyl, substituted cycloalkyl, aliphatic and substituted aliphatic, and the like. These compounds act both as initiators and as modifiers in a polymerization recipe and hence may be used as both catalysts and modifiers in the recipe. However, it is preferred to use a mercaptan modifier along with the diazothioether in the practice of our invention. It is often desirable to use a catalyst such as potassium or sodium ferricyanide in conjunction with the diazothioether, in an amount such as between 0.03 and 1.0 part by weight per 100 parts by weight of monomeric material. Examples of suitable diazothioethers include 2-(2,4-dimethylbenzenediazomercapto)naphthalene, 2-(4-methoxybenzenediazomercapto)naphthalene [known in the art as MDN], 2-methylbenzenediazomercapto)naphthalene, 2 - (2,5-dimethoxybenzenediazomercapto)naphthalene, 4 - (2,5-dimethoxybenzenediazomercapto)toluene, 4 - (2-naphthalenediazomercapto)anisole, 2 - (4 - acetylaminobenzenediazomercapto)naphthalene, 2 - (benzenediazomercapto)naphthalene, 2 - (4 - sulfobenzenediazomercapto)benzothiazole, 2 - (1 - naphthalenediazomercapto)naphthalene, 2 - (4-chlorobenzenediazomercapto)naphthalene, 2 - (5 - quinolinediazomercapto)naphthalene, 2 - (4 - nitrobenzenediazomercapto)naphthalene, 1 - (4 - methoxybenzenediazomercapto)naphthalene, and the like.

The type and amount of diazothioether used in a particular polymerization recipe depends upon the result desired. In general, approximately 0.2 part by weight of diazothioether per 100 parts of monomer will give satisfactory promotion of the polymerization reaction although other proportions within the range of about 0.05 to about 5.0 parts by weight per 100 parts by weight of monomer, can be used.

In the case of a polyalkylene polyamine recipe which can be used for a basic latex, the activating agent, i. e., a polyalkylene polyamine is preferably a polyethylene polyamine or a trimethylene polyamine. Suitable polyethylene polyamines have the general formula RNH(CHXCHXNH)$_m$(CHXCHX)$_n$NHR where R contains not more than eight carbon atoms and is of the group consisting of hydrogen, alkyl, cycloalkyl, aromatic, olefinic, and cycloolefinic radicals, each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and R can be of mixed character when containing six or more carbon atoms, such as alkylcycloalkyl, aralkyl, alkaryl groups, and the like, and both R and X can also have non-hydrocarbon substituents; particularly useful non-hydrocarbon constituents include oxygen in the form of hydroxy and ether compounds, sulfur in similar compounds (i. e., mercapto compounds and thioethers), and halogen compounds. Examples of such polyethylene polyamines include ethylenediamine, hydrazine, diethylenetriamine, tetraethylenepentamine, di(methylethylene) triamine, N - (2 - hydroxyethyl)-1,2-ethanediamine, N-phenylethylenediamine, N - cyclohexyl - N' - (2 - aminoethyl)-1,2-ethanediamine, carbamates of the foregoing, and the like.

Suitable trimethylene polyamines are preferably those having the general formula

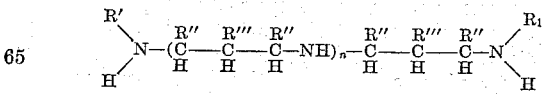

where each R' is one of the group consisting of hydrogen, methyl, ethyl, hydroxymethyl, hydroxyethyl, and carboxy radicals, each R" is hydrogen or methyl, and each R''' is hydrogen, methyl, or an activating substituent of the group consisting of —OR, —SR, —NR$_2$, —CN, —SCN, —COOR, —CHO, with R being hydrogen, methyl, ethyl, n-propyl, or isopropyl or —CHR''' can be C=O, and $n$ is an integer between 0 and 8 inclusive. The compounds containing a single trimethylene group together with its two terminal amino groups is preferred. The simplest of these trimethylene polyamines, or 1,3-diaminopropanes, is 1,3-diaminopropane itself. This compound is also known as trimethylenediamine. Substitution of an —OH or an =O on the central carbon atom of 1,3-diaminopropane appears to enhance the activity in the emulsion polymerization recipes, hence 1,3-diaminoacetone and 1,3-diamino-2-propanol are at present the most preferred 1,3-diaminopropanes. Other 1,3-diaminopropanes, which contain a plurality of trimethylene (unsubstituted or substituted) groups alternating with amino groups, and which are regarded as polymers of the parent compounds, can also be employed; for example tri(trimethylene)tetramine (sometimes erroneously designated as tripropylenetetramine) is considered to be a polymer of trimethylenediamine. All of the polyamino compounds referred to above have the basic structure of 1,3-diaminopropane and hence can be broadly referred to as "1,3-diaminopropane and its derivatives and polymers thereof"; they can also be broadly referred to as "1,3-diaminopropanes" and also as "trimethylene polyamines." It is preferred to use only those polyamines which come within the structural formula defined hereinabove, and all of the compounds so defined are operable in our process to some extent though it will be of course appreciated that the relative activities and efficacies will vary considerably depending upon the size of the molecule and the various constituents thereof, as well as upon the other components and their proportions in the various recipes which may be used. Those skilled in the art will readily ascertain any of the specific compounds which are within the scope of the structural formula. However, by way of example the following are mentioned: 1,3-diaminopropane, 1,3 - diaminoacetone, 1,3 - diamino - 2 - propanol, N,N'-dimethyl-1,3 - diaminoacetone, N - ethoxy - 1,3 - diamino-2 - propanol, 1,3 - diamino - 2 - carboxypropane, 1,3-diamino - 2 - (dimethylamino) - propane, 2,4 - diaminopentane, 1,3 - diamino - 2 - cyanopropane, 1,3 - diamino-2 - mercaptopropane, di(trimethylene)triamine, tri(trimethylene)tetramine, tetra(trimethylene)pentamine, polytrimethylene polyamines in which the amino and trimethylene groups can be substituted as previously mentioned, and carbamates of each of the foregoing.

These polyalkylene polyamine activator compositions appear to serve as reductants and/or activators in the polymerization mixture, and no other activating ingredients, such as compounds of polyvalent-multivalent metals, need be added in order to obtain satisfactory and rapid polymerization of the butadiene, except as such compounds may fortuitously be present as traces in the polymerization mixture. Similarly, no other reducing ingredient, such as a reducing sugar, need be added. However, it is necessary to include an oxidant such as a hydroperoxide to insure rapid polymerization.

The amount of polyalkylene polyamine to be used in any particular case depends upon such variables as the polyamine used, specific ingredients of recipe, and conditions of reaction. In general, amounts of polyalkylene polyamine in the range of 0.1 to 2 parts of polyalkylene polyamine per 100 parts of butadiene will give satisfactory results; however, greater or smaller amounts of polyamine can be used.

The polymeric materials having a multiplicity of carboxy groups which are applicable to this invention are homopolymers of acidic monomers or copolymers of one or more of these monomers with each other or with one or more neutral monomers. The term copolymer is broad and includes a polymer formed from two or more monomers. Acidic monomers, or monomers which contain at least one carboxy group per molecule, which are applicable, include acrylic acid and various alpha and beta alkyl-substituted derivatives in which the alkyl group contains from one to eight carbon atoms, such as methacrylic acid, crotonic acid, alpha and beta ethyl-, propyl-, butyl-, hexyl-, and octylacrylic acids, phenylacrylic acids, i. e., atropic and cinnamic acids; and vinylacrylic acids. Unsaturated dicarboxylic acids such as fumaric, maleic, itaconic, teraconic, and citraconic acids are also applicable. Also useful are derivatives of maleic and fumaric acids such as monoesters from methyl to octyl, alkyl derivatives, i. e., alkyl groups from methyl to octyl attached to the central carbon atoms, and halogen-substituted derivatives. Examples of such monomers include chloromaleic acid, dimethyl fumarate, diethyl maleate, vinyl formate, diethyl chloromaleate, diethyl fumarate, ethyl acid fumarate, ethyl acid maleate, dioctyl maleate, and the like. Of the carboxy-containing monomers which can be employed, acrylic and methacrylic acids are most frequently preferred. Monomers containing other acidic groups are also within the scope of the invention, such as those containing sulfonic acid (—$SO_3H$), sulfuric acid (—$OSO_3H$), phosphoric acid (—OPO—$(OH)_2$), and phosphonic acid (—$PO(OH)_2$) groups. Examples of such monomers include vinyl sulfonic acids, sodium vinyl sulfonate, n-butyl vinylsulfonate, methyl vinyl sulfone, allyl phosphonic acid, 4-phenyl-1,3-buitadine-1-phosphonic acid, 4-vinylbenzene phosphonic acid, 4-vinylbenzene sulfuric acid and 4-vinylbenzene phosphite.

Materials copolymerizable with acid monomers include conjugated dienes, styrene, alpha-methylstyrene, various alkyl-substituted styrenes, acrylonitrile, methacrylonitrile, acrylates such as methyl acrylate, ethyl acrylate, and methyl methacrylate, vinyl chloride, vinylidene chloride, vinyl acetate, methyl vinyl ketone, methyl isopropenyl ketone, methyl vinyl ether, and the like. The preferred monomers are conjugated dienes or mixtures of conjugated dienes with each other or with other polymerizable compounds in addition to the acidic monomers. However, it is to be understood that polymers can be prepared from an acidic monomer with any neutral material or mixture of materials copolymerizable therewith. The conjugated dienes employed are preferably those which contain from four to six, inclusive, carbon atoms per molecule, but those containing more carbon atoms per molecule, e. g., eight, can also be used. These compounds include 1,3-butadiene, isoprene, piperylene, methylpentadiene, 2,3-dimethyl-1,3-butadiene, chloroprene, and others. Furthermore, various alkoxy, such as methoxy and ethoxy, and cyano derivatives of these conjugated dienes can also be employed, i. e., 2-methoxybutadiene and 1-cyanobutadiene.

The carboxy-containing monomer is usually employed in an amount in the range between 1 and 50 parts by weight, preferably between 10 and 50 parts by weight, per 100 parts total monomeric material. That is, we prefer a copolymer of an acidic monomer containing at least 50 percent by weight of a neutral monomer, such as a conjugated diene or styrene.

The basic polymers with which this invention is concerned are homopolymers prepared from monomeric materials containing at least one basic group per molecule or copolymers of these basic materials with each other or with copolymerizable neutral monomers.

Basic monomers, or monomers which contain at least one basic nitrogen group per molecule, which are applicable, generally are of the tertiary amine type, however, the primary and secondary amine types can be used. Of these compounds, those which are most frequently preferred are pyridine and quinoline derivatives containing at least one vinylidene group. The term "vinylidene group" represents a

substituent where R is either hydrogen or a methyl group, i. e., the substituent is either a vinyl or an alpha-methylvinyl (isopropenyl) group. The vinylidene-substituted pyridine and quinoline compounds which are preferred are those having only one

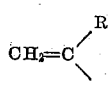

substituent and of these compounds those belonging to the pyridine series are most frequently used. Various alkyl-substituted derivatives are also applicable but it is generally preferred that the total number of carbon atoms in the nuclear-substituted alkyl groups should not be greater than 12 and most frequently these alkyl groups are methyl and/or ethyl. Examples of such compounds are 2-vinylpyridine; 3-vinylpyridine; 4-vinylpyridine; 2,4,6-trimethyl-3-vinylpyridine; 3,4,5,6-tetramethyl-2-vinylpyridine; 3-ethyl-5-vinylpyridine; 2-methyl-5-vinylpyridine; 2,6-diethyl-4-vinylpyridine; 2-isopropyl-4-nonyl-5-vinylpyridine; 2-methyl-5-undecyl-6-vinylpyridine; 3-dodecyl-2,4-divinylpyridine; 2,4-dimethyl-5,6-diphenyl-3-vinylpyridine; 3,5-di(alpha-methylvinyl)pyridine; similar mono and di substituted alkene, alkadiene and alkyne pyridines; and like quinolines. Other polymerizable compounds which contain basic nitrogen groups and which are also considered applicable include dialkylaminostyrenes, such as N,N-dimethylaminostyrene, diethylaminostyrene, 3-methyl-4-ethyl-5-aminostyrene, dipropylaminostyrene, methylpropylaminostyrene, and the corresponding dialkyl-amino-alphamethyl-styrenes, dialkylaminoethyl acrylates such as dimethylaminoethyl acrylate, diethylaminoethyl acrylate, dipropylaminoethyl acrylate, methylethylamino-ethyl acrylate, etc., and the corresponding dialkylamino-ethyl methacrylates, e. g., dimethylaminoethyl methacrylate, diethylaminoethyl methacrylate, and the like. In general, the alkyl group will be attached to the nitrogen but one or both can be attached to the carbon ring. Other basic polymers which are applicable to our invention include copolymers of vinylpyrrole, vinylmorpholine, alkenylamines, vinylpyrazine, vinylpyridazine, and vinylpiperazine, as well as other vinyl heterocyclic nitrogen containing compounds.

The neutral materials copolymerizable with basic monomers are the same as those hereinbefore given as being copolymerizable with acidic monomers. Of these materials, conjugated dienes or mixtures of conjugated dienes with each other or with other polymerizable compounds are preferred.

The polymerizable compound containing basic nitrogen groups is usually employed in an amount in the range between 1 and 50 parts by weight, preferably between 10 and 50 parts by weight, per 100 parts total monomeric material.

As has been herein pointed out our preferred acidic latex comprises a copolymer of acrylic acid and various alpha and beta alkyl-substituted derivatives thereof in which the alkyl group contains from one to eight carbon atoms such as methacrylic acid, crotonic acid, alpha and beta ethyl-, propyl-, butyl-, hexyl-, and octylacrylic acids; phenylacrylic acids, i. e., atropic and cinnamic acids; and vinylacrylic acids along with at least 50 percent by weight of a conjugated diene containing four to six carbon atoms such as 1,3-butadiene, isoprene, piperylene, methyl pentadiene, 2,3-dimethyl-1,3-butadiene, and chloroprenes. These copolymers are unsaturated and when separated from the emulsion have rubbery properties, i. e., they can be vulcanized, have elasticity, are flexible, etc. Specifically we prefer to use a latex comprising a copolymer of butadiene and acrylic or methacrylic acid since these monomers have found wide use commercially and are readily available.

We have also pointed out that our preferred basic latex comprises a copolymer of at least 50 percent by weight of a conjugated diene as described in the preceding paragraph with a vinyl substituted heterocyclic nitrogen containing compound such as 2-vinylpyridine; 3-vinylpyridine; 4-vinylpyridine; 2,4,6-trimethyl-3-vinylpyridine; 3,4,5,6-tetramethyl-2-vinylpyridine; 3-ethyl-5-vinylpyridine; 2,6-diethyl-4-vinylpyridine; and similar quinolines. The 2-methyl-5-vinylpyridine and the 2-vinylpyridine are widely used commercially. These copolymers also have rubbery properties. We have found when the latices containing these preferred copolymers are mixed and used in accordance with the teaching of this application, a strong pliable and vulcanizable film is formed.

The advantages of our invention can best be described by way of the following examples, which are given for the purpose of illustration only and they are not intended to limit the scope of our invention in any manner. For example, any of the polymers or copolymers containing a multiplicity of acid groups and any of the polymers or copolymers containing a multiplicity of basic groups, as disclosed, may be used in place of the polymers used to illustrate these examples. The particular polymers used give rubbery films which are superior in many ways, as shown by the example, to films prepared by conventional methods.

*Example I*

A series of butadiene/acrylic acid and butadiene/2-methyl-5-vinylpyridine copolymers was prepared by emulsion polymerization at 5° C. in accordance with the following recipe:

| | Parts by weight |
|---|---|
| Butadiene | Variable |
| Acrylic acid or 2-methyl-5-vinylpyridine | Variable |
| Water | 180 or 315 |
| Duponol ME [1] | 4 or 8 |
| tert-dodecyl mercaptan | Variable |
| tert-butylisopropylbenzene hydroperoxide | 0.115 |
| KCl | 0.1 |
| FeSO$_4$.7H$_2$O | 0.139 |
| K$_4$P$_2$O$_7$ | 0.165 |

[1] Sodium lauryl sulfate.

The following polymerization data were obtained:

BUTADIENE/ACRYLIC ACID COPOLYMERS

| Butadiene, parts | Acrylic acid, parts | tert-C$_{12}$ Mercaptan, parts | Water, parts | Duponol ME, parts | Conversion, percent, in 1.2 hours |
|---|---|---|---|---|---|
| 90 | 10 | 1 | 180 | 4 | 51 |
| 80 | 20 | 1 | 180 | 4 | 55 |
| 70 | 30 | 1 | 180 | 4 | 53 |
| 50 | 50 | 1 | 315 | 8 | 54 |

BUTADIENE/2-METHYL-5-VINYLPYRIDINE COPOLYMERS

| Butadiene, parts | Methylvinyl pyridine, parts | tert-C$_{12}$ Mercaptan, parts | Water, parts | Duponol ME, parts | Conversion, percent, in— | | | |
|---|---|---|---|---|---|---|---|---|
| | | | | | 1.7 hours | 2.3 hours | 2.7 hours | 5 hours |
| 90 | 10 | 0.4 | 180 | 4 | 40 | 53 | | |
| 80 | 20 | 0.4 | 180 | 4 | 38 | | | |
| 70 | 30 | 0.4 | 180 | 4 | 30 | | 50 | |
| 60 | 40 | 0.4 | 180 | 4 | 21 | | | 56 |

The latices were each stripped to remove unreacted monomers.

In three runs, latices of the same monomer charge ratios (90/10, 80/20, and 70/30) were blended so that the final product contained equimolar amounts of acrylic acid and 2-methyl-5-vinylpyridine. These latex mixtures were all stable. In a fourth run, a 50/50 butadiene/acrylic acid latex was blended with a 60/40 butadiene/2-methyl-5-vinylpyridine latex. As in the other cases, the quantities were adjusted so that equimolar amounts of acrylic acid and 2-methyl-5-vinylpyridine were present. Prior to making this blend, ammonium hydroxide was added to the butadiene/acrylic acid latex until the pH was raised to 7. The latex blend was stable.

Each of the several latex blends prepared was used in the preparation of a film. Each blend was poured onto a surface where the film was to be deposited and the water allowed to evaporate. The resulting film comprised a reaction product of the two types of polymers. After air-drying the films 5.5 days at a temperature of 20–25° C., standard dumbbell samples were cut and tests were made for tensile strength and elongation. The test specimens were then heated 22 hours at 60° C. and tensile strength and elongation tests made again. In another series of tests, a portion of the air-dried film was boiled in water 1.0 hour, dried 15 hours at 60° C., and standard samples were cut and tested as before. The following results were obtained.

| Charge ratio | Air dried | | Heated 22 hours at 60° C. | | Boiled in water, heated 15 hours at 60° C. | |
|---|---|---|---|---|---|---|
| | Tensile, p. s. i. | Elongation, percent | Tensile, p. s. i. | Elongation, percent | Tensile, p. s. i. | Elongation, percent |
| 90/10 | 100 | 2,000 | | 2,000 | 100 | 2,000 |
| 80/20 | 200 | 2,000 | 50 | 2,000 | 100 | 2,000 |
| 70/30 | 400 | About 1,500 | 325 | 1,050 | 650 | 1,100 |
| 50/50–60/40 | 100 | 680 | 1,450 | 700 | 1,850 | 560 |

It can be seen from the above, that the films containing the higher amounts of functional group had excellent tensile strengths, especially after curing with heat.

*Example II*

A second series of butadiene/acrylic acid and butadiene/2-methyl-5-vinylpyridine copolymers was prepared by emulsion polymerization at 5° C. in accordance with the recipe of Example I. The pH of the latices was adjusted to various levels as were the solids content. The two latices were mixed and the percent coagulum formed based on the total polymeric material was determined.

| Expt. No. | Monomer ratio, Bd/MVP | Solids, percent | pH | Monomer ratio, Bd/AA | Solids, percent | pH | Coagulum, percent of polymer | pH of blend |
|---|---|---|---|---|---|---|---|---|
| 1 | 90/10 | 16.8 | 7.9 | 90/10 | 28.2 | 3.1 | 22 | |
| 2 | 90/10 | 16.8 | 7.9 | 90/10 | 23.2 | 3.5 | 3 | |
| 3 | 80/20 | 17.5 | 8.0 | 80/20 | 36.0 | 2.9 | 22 | |
| 4 | 80/20 | 17.5 | 8.0 | 80/20 | 24.1 | 4.0 | 6 | |
| 5 | 70/30 | 21.9 | 8.1 | 70/30 | 36.2 | 2.8 | 37 | |
| 6 | 70/30 | 21.9 | 8.1 | 70/30 | 27.0 | 3.2 | 31 | |
| 7 | 70/30 | 32.8 | 8.3 | 70/30 | 36.2 | 2.8 | 31 | |
| 8 | 70/30 | 32.8 | 8.3 | 70/30 | 27.0 | 3.2 | 44 | |
| 9 | 70/30 | 32.8 | 8.3 | 70/30 | 32.2 | 4.9 | 1 | |
| 10 | 60/40 | 8.1 | 8.4 | 50/50 | 5.7 | 2.4 | 89 | |
| 11 | 60/40 | 10.7 | 8.4 | 50/50 | 20.8 | 5.8 | 0 | 7.0 |
| 12 | 60/40 | 35.8 | 8.5 | 50/50 | 27.0 | 2.5 | 71 | |
| 13 | 60/40 | 9.0 | 8.6 | 50/50 | 5.7 | 2.8 | 72 | |
| 14 | 60/40 | 9.0 | 8.6 | 50/50 | 6.0 | 4.6 | 66 | |
| 15 | 60/40 | 9.0 | 8.6 | 50/50 | 6.5 | 4.6 | 67 | |
| 16 | 60/40 | 9.0 | 8.6 | 50/50 | 5.6 | 4.7 | 66 | |
| 17 | 60/40 | 9.0 | 8.6 | 50/50 | 6.0 | 5.0 | 22 | 6.5 |
| 18 | 60/40 | 9.0 | 8.6 | 50/50 | 6.1 | 5.1 | 21 | 6.6 |
| 19 | 60/40 | 9.0 | 8.6 | 50/50 | 6.1 | 5.4 | 4 | 6.6 |
| 20 | 60/40 | 9.0 | 8.6 | 50/50 | 5.5 | 5.4 | 0 | 6.9 |
| 21 | 60/40 | 9.0 | 8.6 | 50/50 | 5.7 | 5.5 | 0 | 6.9 |
| 22 | 60/40 | 9.0 | 8.6 | 50/50 | 6.3 | 6.4 | 2 | 7.0 |
| 23 | 60/40 | 9.0 | 8.6 | 50/50 | 5.7 | 6.6 | 1 V | 7.5 |
| 24 | 60/40 | 9.0 | 8.6 | 50/50 | 5.7 | 7.1 | 1 V | 7.8 |
| 25 | 60/40 | 9.0 | 8.6 | 50/50 | 6.6 | 7.3 | 1 V | 8.0 |
| 26 | 60/40 | 7.6 | 8.8 | 50/50 | 27.0 | 2.6 | 84 | |
| 27 | 60/40 | 7.6 | 8.8 | 50/50 | 17.4 | 3.3 | 52 | |
| 28 | 60/40 | 7.6 | 8.8 | 50/50 | 20.8 | 5.9 | Trace | |
| 29 | 60/40 | 9.0 | 11.3 | 50/50 | 6.0 | 4.9 | 13 | 7.5 |
| 30 | 60/40 | 8.7 | 11.9 | 50/50 | 6.0 | 5.1 | 16 | 7.4 |
| 31 | 60/40 | 9.2 | 12.3 | 50/50 | 6.0 | 5.1 | 23 | 7.8 |
| 32 | 60/40 | 9.2 | 12.4 | 50/50 | 5.7 | 2.8 | 72 | |

[1] V indicates a marked increase in viscosity without formation of measurable coagulum.

The above data shows that latices containing basic polymers can be blended with latices containing acidic polymers when the pH is controlled according to our invention. This data is plotted to make the attached figure.

Several of the above mixtures were stored for four months after the two latices were blended and the initial coagulum filtered off. At the end of this period, the latices were still stable and fluid. These mixtures were numbers 17, 18, 19, 20 and 21.

In describing our invention, we have used butadiene-acrylic acid copolymers as our acidic polymer and butadient/2-methyl-5-vinylpyridine copolymers as our basic polymer. Those skilled in the art will recognize that many modifications can be made in our process without departing from the scope thereof. For example, any of the acidic and basic copolymers as have been indicated are applicable in our invention.

We claim:

1. A process of producing a stable latex which comprises bringing together a latex of a polymeric material containing a multiplicity of acidic groups per molecule with a latex of a polymeric material containing a multiplicity of basic nitrogen groups per molecule and wherein the pH of the latex of the polymeric material containing a multiplicity of acid groups, the pH of the latex containing the multiplicity of basic nitrogen groups have a predetermined relationship as determined by pH falling on the left side of the line of the figure and wherein the pH of the mixed latex is no greater than 7.0.

2. A process of producing a stable latex containing a polymeric material having a multiplicity of acidic groups and a polymeric material having a multiplicity of basic nitrogen groups, the said process comprising bringing together a latex containing 1 to 40 weight percent of a copolymer comprising 1 to 50 parts by weight of a monomer having an acid functional group and 50 to 99 parts by weight of a neutral monomer group with a latex containing 1 to 40 weight percent of a copolymer comprising 1 to 50 parts by weight of a monomer containing a basic nitrogen functional group and 50 to 99 parts by weight of a neutral monomer, the said latices having pH's of predetermined relationship as determined by pH falling on the left side of the line of the figure and the pH of the blended latex having a pH no greater than 7.0.

3. The process of claim 2 wherein the acidic groups are carboxyl groups.

4. The process of claim 2 wherein the latex containing acid functional groups is a latex of a copolymer of butadiene and acrylic acid and the latex containing basic nitrogen functional groups is a latex of a copolymer of butadiene and 2-methyl-5-vinylpyridine.

5. A process of producing a stable latex containing a polymeric material having a multiplicity of acidic groups and a polymeric material having a multiplicity of basic nitrogen groups, the said process comprising bringing together 1 to 99 percent by weight based on the total weight of polymeric materials of a latex of a polymeric material containing a multiplicity of acidic groups, the said polymeric material being a copolymer of 1 to 50 percent by weight of a monomer having an acidic functional group and 99 to 50 percent of a neutral monomer, with 99 to 1 percent of a latex of a polymeric material containing a multiplicity of basic nitrogen groups, the last said polymeric material being a copolymer of 1 to 50 per cent by weight of a monomer having a basic nitrogen functional group and 99 to 50 percent of a neutral monomer, the pH's of the two latices having a predetermined relationship one with the other as determined by being the area to the left of the line of the figure, the resulting blended latex having a pH no greater than 7.0, and filtering the resulting mixture to remove coagulum.

6. The process of claim 5 wherein the predetermined relationship of the respective pH's is determined by a line having the equation $Y=2.8X-18.75$ when such a line is plotted on a graph where the X—X axis represents pH of the basic latex and the Y—Y axis represents the pH of the acidic latex and wherein a plot of the respective pH's one against the other will fall to the left of said line.

7. The process of claim 6 wherein the neutral monomer is butadiene, the monomer containing a functional acid group is acrylic acid, and the monomer containing a functional basic nitrogen group is 2-methyl-5-vinylpyridine.

8. The process of claim 6 wherein the neutral monomer is butadiene, the monomer containing a functional acidic group is selected from the group consisting of alpha and beta alkyl substituted derivatives of acrylic acid wherein the alkyl substituents contain 1 to 8 carbon atoms and the monomer containing a functional basic nitrogen group is selected from the group consisting of hydrocarbon substituted pyridines and quinolines, wherein at least one substituent is a vinylidene group and wherein the total number of carbon atoms in substituent groups does not exceed 12.

9. The process of claim 6 wherein the neutral monomer is butadiene, the acidic monomer is acrylic acid and the basic monomer is 2-vinylpyridine.

10. The process of claim 6 wherein the neutral monomer is butadiene, the acidic monomer is methacrylic acid, and the basic monomer is 2-methyl-5-vinylpyridine.

11. The process of claim 6 wherein the neutral monomer is butadiene, the acidic monomer is methacrylic acid, and the basic monomer is 2-vinylpyridine.

12. A process of producing a stable latex containing a polymeric material having a multiplicity of acidic groups and a polymeric material having a multiplicity of basic nitrogen groups, the said process comprising copolymerizing 50 to 99 parts by weight of butadiene with 1 to 50 parts by weight of monomer having at least one carboxyl group in an aqueous emulsion so that the resulting latex will contain 1 to 40 parts by weight of polymeric material, and adjusting the pH of the resulting latex to within the range of 3 to 7; copolymerizing 50 to 99 parts by weight of butadiene with 1 to 50 parts by weight of a monomer having at least one basic nitrogen group in an aqueous emulsion so that the resulting latex will contain 1 to 40 parts by weight of polymeric material and adjusting the pH of the resulting latex to within the range of 7 to 9; bringing 1 to 99 parts by weight of the first said latex together with 99 to 1 parts of the second said latex; and filtering the resulting mixed latex to remove coagulum.

13. The process of claim 12 wherein the pH of the two latices are adjusted by exhaustive stripping.

14. A composition of matter comprising a stable latex of 1 to 99 parts by weight of a copolymer of 1 to 50 parts by weight of a monomer containing at least one acidic group and 50 to 99 parts of a neutral monomer and 99 to 1 parts by weight of a copolymer of 1 to 50 parts by weight of a monomer containing at least one basic nitrogen group and a neutral monomer, the said latex containing 1 to 40 weight percent dispersed solids.

15. A composition of matter comprising a stable latex of 1 to 99 parts by weight of a copolymer of 1 to 50 parts by weight of a monomer containing at least one acidic group and 50 to 99 parts of a neutral monomer and 99 to 1 parts by weight of a copolymer of 1 to 50 parts by weight of a monomer containing at least one basic nitrogen group and a neutral monomer, the said latex containing 1 to 40 weight percent dispersed solids, the said stable latex being formed by bringing together a latex containing 1 to 40 weight percent of the first said copolymer with a latex containing 1 to 40 weight percent of the second said copolymer, the two said latices having pH's of a predetermined relationship as determined by pH falling on the left side of the line of the figure, and the composition of matter having a pH of not greater than 7.

16. The composition of claim 15 wherein the first said copolymer is a copolymer of butadiene and acrylic acid and the second said copolymer is a copolymer of butadiene and 2-methyl-5-vinylpyridine.

17. The composition of claim 15 wherein the first said copolymer is a copolymer of butadiene and acrylic acid and the second said copolymer is a copolymer of butadiene and 2-vinylpyridine.

18. The composition of claim 15 wherein the first said copolymer is a copolymer of butadiene and acrylic acid and the second said copolymer is a copolymer of butadiene and 3-vinylpyridine.

19. The composition of claim 15 wherein the first said copolymer is a copolymer of butadiene and methacrylic acid and the second said copolymer is a copolymer of butadiene and 2-methyl-5-vinylpyridine.

20. The composition of claim 15 wherein the first said copolymer is a copolymer of butadiene and methacrylic acid and the second said copolymer is a copolymer of butadiene and 3-vinylpyridine.

References Cited in the file of this patent

UNITED STATES PATENTS 2,614,093     Wheelock  -------------- Oct. 14, 1952